UNITED STATES PATENT OFFICE.

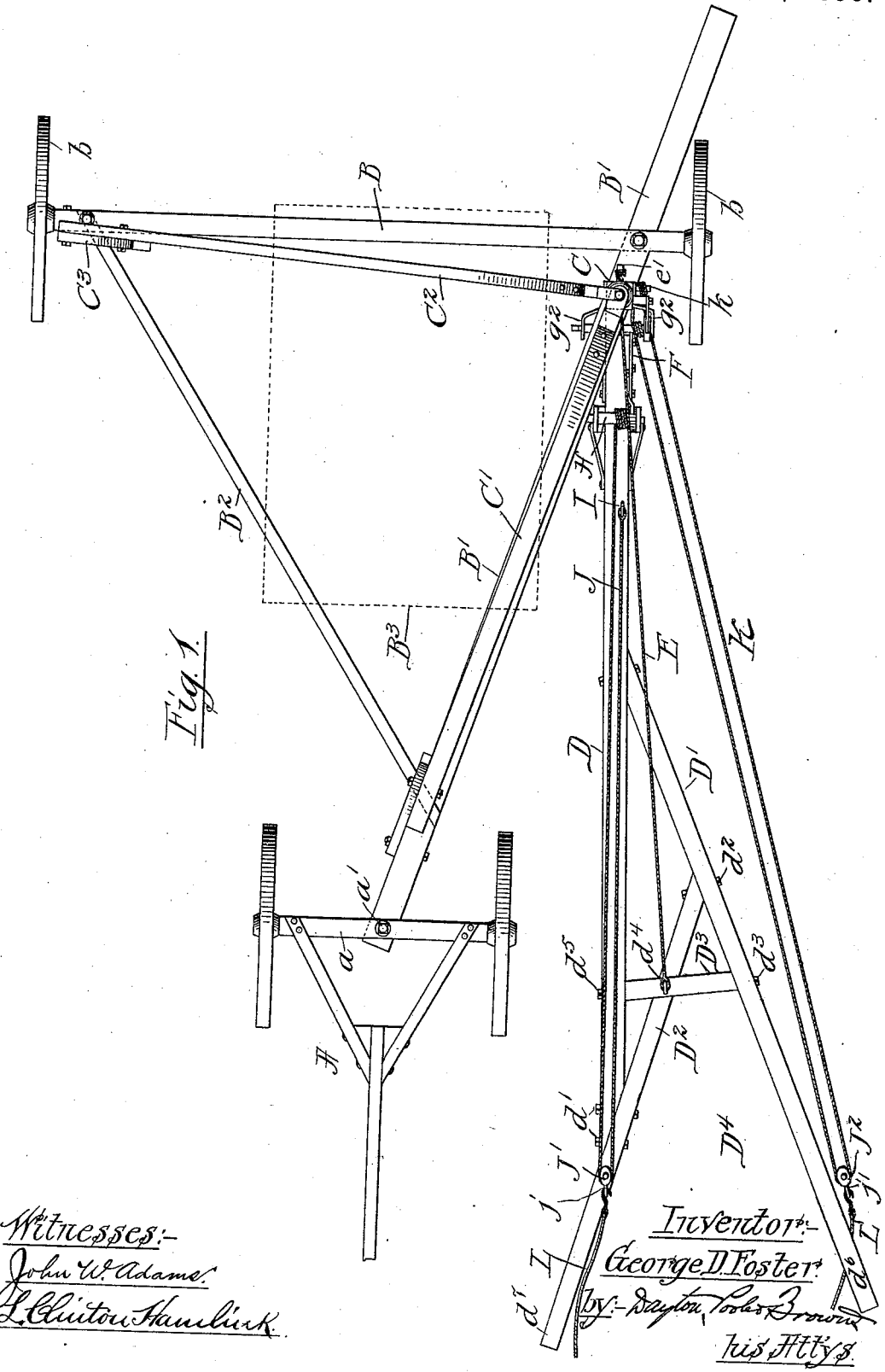

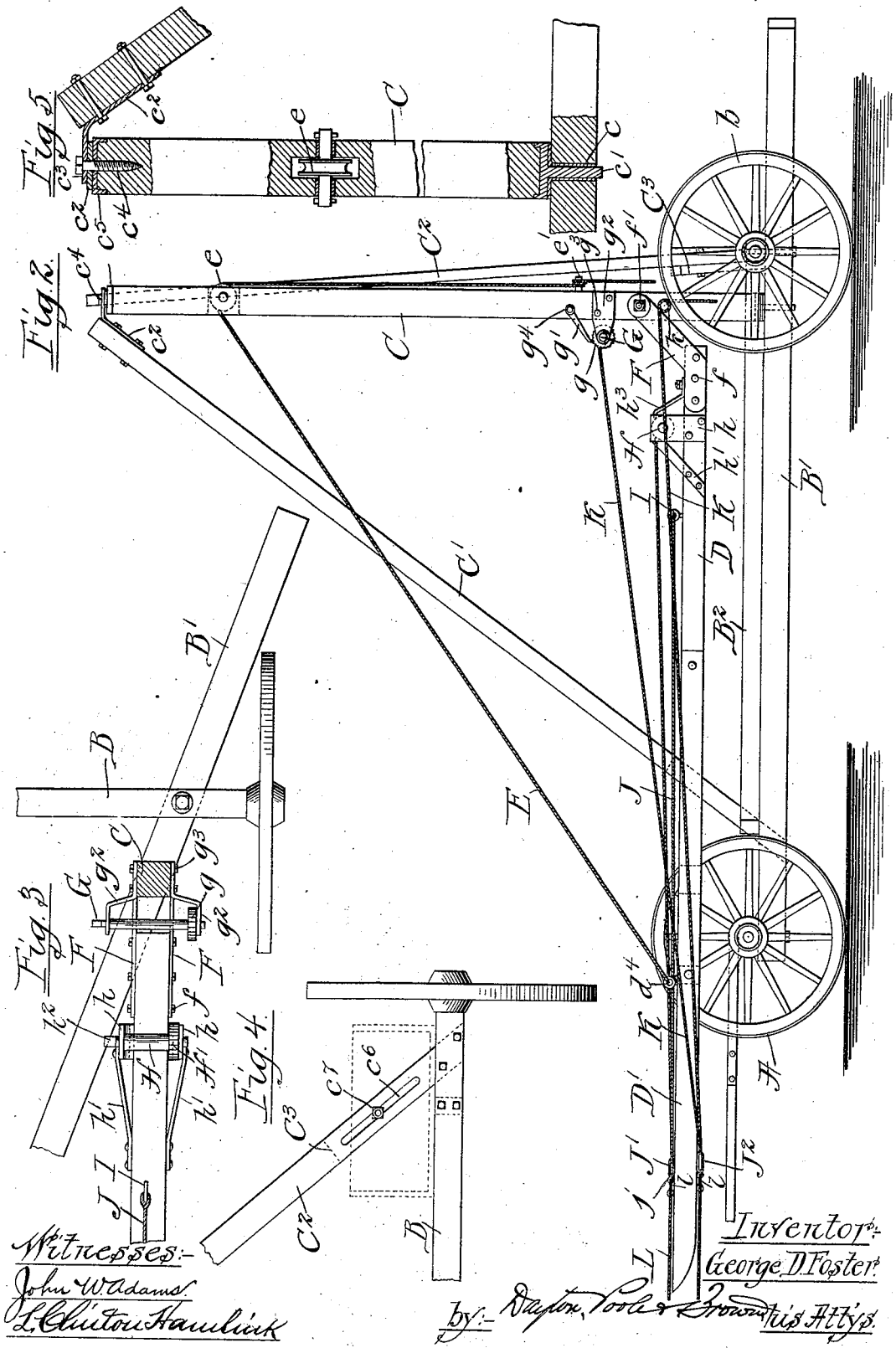

GEORGE D. FOSTER, OF PRESTON, IOWA.

PORTABLE CORN-SHOCK PRESS.

SPECIFICATION forming part of Letters Patent No. 562,177, dated June 16, 1896.

Application filed January 20, 1896. Serial No. 576,097. (No model.)

*To all whom it may concern:*

Be it known that I, GEORGE D. FOSTER, of Preston, in the county of Jackson and State of Iowa, have invented certain new and useful Improvements in Portable Corn-Shock Presses; and I do hereby declare that the following is a full, clear, and exact description thereof, reference being had to the accompanying drawings, and to the letters of reference marked thereon, which form a part of this specification.

This invention relates to an improved device for compressing shocks of corn in the field in order that they may be bound, and more especially to portable presses.

It is a common practice among farmers to gather a number of hills of corn together, after cutting the same, into what is called a "shock." A shock will usually be composed of a hundred and twenty hills—that is to say, an area of the field comprising ten hills in one direction and twelve hills in another direction is covered, and the corn, after being cut, is placed together in the center of such area on end, and the upper ends of the stalks, being held together by a binding-twine, passed around the upper part of the shock. This binding-twine is neither placed in such position upon the shock nor is it sufficiently strong to bind the shock into a compact bundle, whereby it may be bodily lifted from the ground; but is simply for the purpose of holding the upper ends together and preventing the separate stalks of corn from falling over under the influence of wind and weather. The shocks are subsequently loaded upon a wagon or hay-rack, the binding-twine having first been cut, and the loose fodder carted to some convenient place—to a barn, for example—where the stalks may be stored away, or cut up for fodder, or otherwise disposed of. If this is not done, the cutting-machine is taken into the field and the fodder is prepared there.

I find that it is very desirable to be able to remove a corn-shock bodily from the field to some convenient place, as for example, a barn, so that it may be therein stored for use in the future, or where the fodder may be more conveniently prepared. There have been two difficulties, however, which have prevented this practical handling of the corn-shock. First, there have been no means devised whereby it is practical to compress the large number of hills of corn that usually constitute a shock in order that they may be bound together, and, secondly, there have been no adequate means provided for hoisting such a heavy bundle or shock when bound into some kind of a conveyance, whereby the shock may be transported to a given point. I have made improvements in both directions, but in this application I purpose to describe and claim simply a portable apparatus adapted for practical use in the field as a press for gathering into compact form the hills of corn constituting a shock in order that the same may be properly bound together.

With the above explanation, together with the accompanying description and drawings, the invention will be readily understood and will be defined in the appended claims.

Referring now to the drawings, Figure 1 illustrates in a plan view a portable press embodying my invention. Fig. 2 is a side view of the same. Fig. 3 is a plan view of one portion of the rear of the press, showing the swinging beam. Figs. 4 and 5 are detail views showing some of the minor features of the construction.

The apparatus consists of a triangular-shaped running-gear and framework, supported, preferably, upon four wheels, the two forward wheels of which may be connected with a pole and may be the forward wheels of any suitable farm wagon or vehicle, while the rear wheels belong to the press proper. Let A designate the forward set of wheels and running-gear, as a whole; B, the rear axle, to which are secured the rear wheels $b$. Permanently secured to the left side of the axle B is a relatively long timber or beam B', its forward end being pivotally secured to the axle $a$ by a king-bolt $a'$, or other equivalent means. A strengthening timber or brace B² is secured at one end to the right-hand end of the rear axle B, and secured at its other end to the timber B', at a point somewhat in rear of the end thereof. The timber B', the brace B² and the axle B constitute the triangular open framework of the device proper. If desired, a portion of this frame may be covered by boards, which form a platform B³, as shown. The length of the axle $a$ will be stretched to bring the distance between the wheels thereon coincident with the distance between the hills of corn, as is usual in the running-gears of farm implements or vehicles. The distance between the wheels $b$ and their relative location with respect to the wheels of the front running-gear will also be governed by the distance between the hills of corn. The timber B' will preferably be secured to the axle $a$ and to the axle B beneath the latter, so as to be relatively low, in order that the center of gravity of the device, as a whole, when the superstructure is added, will come to any desired point and make the removal of the device from shock to shock more easy on the horses drawing the same.

C is a vertical timber or upright post secured at its lower end in the frame-timber B', at a point close to the union of the latter with the axle B. Any convenient means of securing this pivotal connection may be adopted, but as a simple and convenient mechanism I use a flanged metal thimble $c$, surrounding a suitable vertical aperture in the frame-timber B', and upon the lower end of the upright post or timber C, I secure a metal pivotal stud or pin $c'$, of a diameter adapted to enter the thimble $c$. By this means any slight turning of the post C does not cause any perceptible wearing away of the end thereof, the rubbing-surface, as indicated by Fig. 5, being of metal. The upper end of the timber C is held in position and braced by two supporting-timbers C' C$^2$. The timber C' is secured at its lower end to the frame-timber B', while the timber C$^2$ is secured at its lower end to the axle B.

The upper end of each brace-timber C' C$^2$ is provided with a metal arm $c^2$, suitably secured to the brace-timber, and having a horizontal extended end portion $c^3$, provided with a suitable aperture through which a stud, bolt or lag-screw $c^4$ may enter, and by which the said metal arms are pivotally secured to the upper end of the timber C. As a matter of construction merely, I prefer to place a metal cap $c^5$ upon the top of the timber C, but this obviously is not necessary.

I have stated that the lower ends of the brace-timbers C' and C$^2$ are secured, respectively, to the frame-timber B' and to the axle B. The exact construction will be more readily understood by reference to Figs. 1 and 4. A short timber or extension C$^3$ is rigidly secured to the right-hand end of the axle B, and in a direction coincident with that of the brace-timber C$^2$, and the latter is brought down and adjustably bolted or secured to the extension C$^3$ by means of an elongated slot $c^6$, either in the lower end of the timber C$^2$ or in the extension C$^3$, and a nut and bolt $c^7$. A similar construction is used to adjustably unite the lower end of the brace-timber C' to the forward end of the frame-timber B'. I have now described the portable frame and the derrick arrangement comprising the upright C and the adjustable brace-timbers C' and C$^2$.

I will now describe the particular features of construction that more directly relate to the press proper.

The press consists of a swinging boom, mounted at its rear end near the lower portion of the upright C, and steadied at its forward end by means of a suitable cable or rope attached to the upper part of the upright or derrick C, together with a suitable compressing device mounted on said boom. The framework of the boom comprises four main pieces D D' D$^2$ and a cross-piece D$^3$, the general and relative arrangement of which is clearly illustrated in Fig. 1. The timbers D and D$^2$ are placed at such an angle to each other that, together with the cross-timber D$^3$, they form the general shape of a letter A. The inner end of the timber D' is securely bolted at $d'$ to the timber D$^2$, while the latter is bolted at $d^2$ to the timber D'. The cross-timber D$^3$ is bolted to the timbers D', D$^2$ and D by the bolts $d^3$, $d^4$ and $d^5$, respectively, the bolts $d^4$ extending vertically through the timbers D$^2$ and D$^3$, and is preferably provided at its upper end with an eye, to which one end of a cable E may be secured. This cable E will pass over a pulley $e$, suitably mounted in the upright C, and at its lower end the cable E may be snubbed about a pin $e'$ upon the lower end of the upright C, within convenient reach of a person standing upon the ground. It will readily be understood, therefore, that the forward end of the boom may be raised or lowered, as desired, and be held in any predetermined position by unloosening the rope or cable E from the pin $e'$, paying the rope out or taking up slack, as the case may be, and again snubbing the rope or cable about the pin $e'$.

The rear end of the timber D is positioned in close proximity to the upright C, and is provided with a metal arm or extension F, suitably bolted at $f$ to the timber D, and pivotally secured at $f'$ to the upright C. I have shown in Fig. 3 two of said metal arms F, but I do not desire to be limited thereto. Any mechanism by which the timber D may be movably secured to the upright C in such manner as to allow a vertical or lateral movement of the timber D with respect to the upright C, I desire to be included within the scope of my invention and claims. The angle at which the timbers D' and D$^2$ are secured and the length of these timbers from the cross-timber D$^3$ will be such as to afford a spread of fully six feet between the outer ends $d^6$ $d^7$ of said timber, whereby the maximum-sized corn-shock may be embraced between the adjacent margins of said timbers. The length of the cross-timber D$^3$, between the timbers D' and D$^2$, will preferably be about eighteen inches.

In operation, a team of horses will be secured to the running-gear A, the cable E will be suitably slackened and the entire apparatus drawn forward until a shock of corn is embraced in the space $D^4$ between the timbers $D'$ $D^2$ $D^3$. It is desirable that the shock be bound nearer its lower end, on account of the extra weight being at the lower end of the shock, and therefore the position of the boom, as a whole, will be governed by the judgment of the operator and the size and character of the shock. Having determined the position of the boom, the slack in the cable E will be taken up and the cable snubbed around the pin $e'$, as before stated. The shock will now be in position to be pressed into compact form, ready for binding, and I will therefore now proceed to describe the means for compressing the shock.

At a convenient point above a point in the upright C, I secure a spindle G, provided at one end with a ratchet $g$ and a pawl $g'$. As shown in the drawings, Figs. 2 and 3, this particular construction consists of a spindle G, considerably longer than the thickness or width of the timber C, said spindle being suitably supported upon outwardly and forwardly curved brackets $g^2$, rigidly secured at $g^3$ to the timber C. The pawl $g'$ is a gravity-pawl, pivotally secured at $g^4$ to the timber C. One end of the spindle G is squared in the usual manner to receive any suitable handle, whereby the device just described may be used as a windlass, about which a rope or cable may be wound.

The particular construction of the windlass is not deemed of importance, and I desire to have it understood that any means for winding the cable may be employed in place of the windlass just described.

Near the rear end of the boom and upon the timber D, I also place a windlass of any approved pattern. As a very simple construction, not liable to get out of order, I use a spindle or drum H, suitably supported upon uprights $h$, the latter being rigidly secured at their lower ends to the timber D. To guard against the forward strain, I provide brace rods or bars $h'$, secured also at their lower ends to the timber D. The spindle or drum H is provided at one end $h^2$ with means for the attachment of a handle, whereby the drum may be rotated, and is provided at its other end with a ratchet H'. A gravity-pawl $h^3$, suitably secured upon the rear end of the timber D, is adapted to engage the teeth of the ratchet H'. At a convenient point upon the timber D, and preferably just in front of the drum H, is a ring or eyebolt I, to which one end of a cable or rope J will be secured. This rope J will pass through a pulley-block J', and be brought back and secured to the windlass or drum H, the pulley-block J' having, as usual, an eye or ring $j$. A second rope or cable K will be passed through a similar pulley-block $J^2$, provided with an eye $j'$, and one end of the cable or rope K will be secured to the spindle or windlass G, while the other end will be snubbed about a pin $k$ upon the lower end of the upright C. Secured to the two rings or eyes $j\ j'$ is a compressing rope, chain or cable L.

The operation of compressing the shock will now be described.

Understanding that the shock is in the space $D^4$, by reason of the fact that the apparatus has been moved bodily toward the shock, the operator will slacken the cable or chain K by taking it entirely off the pin $k$, and will pass the chain or cable L entirely about the outside of the shock. The slack in the rope or cable K will then be taken up, and the end of the rope or cable snubbed about the pin $k$. The two windlasses or spindles G and H will now be operated alternately if there be but one operator, and simultaneously if there be two persons conveniently at hand, whereby the cables K and J will be wound, respectively, upon the windlasses or spindles G H, and the shock will be drawn by the surrounding rope or chain L compactly into the converging arms or timbers $D'$ $D^2$, and against the brace-timber $D^3$, and thus be pressed into the smallest possible compass. When the shock has been compressed to the desired dimension, the pawls $h^3$ and $g'$ will engage the ratchets H' $g$, and thus hold the cables J and K until the operator has had time to pass a suitable wire or other binding device about the shock and secure it in position. Thereupon the pawls $g'$ $h^3$ may be released and the chain L may be removed from the bundle by unsnubbing the end of the cable K from the pin $k$. In some instances I may provide one end of the chain L with hooks $l$, adapted to engage the eyes $j\ j'$, in which case the bound bundle or shock may be very quickly released by removing one of the hooks $l$ from said eyes. The bound bundle thus standing in the space $D^4$ is easily gotten rid of by simply driving the team attached to the running-gear A forward, whereupon the boom will simply tip the bound shock or bundle over on its side, as the entire apparatus is moved forward, and the bundle will thus be in proper position for its band to be engaged by any hook or hoisting device that may subsequently be employed for lifting the shock onto a vehicle.

I suggest that in placing the chain or rope L around the shock before compression takes place, that one end of the chain—for example, that secured to the eye $j$—be placed above the timber $D^2$, while the other end be placed underneath the timber $D'$. I have found that by this arrangement there is no possibility of the chain L slipping, and the shock is positively drawn or wedged into the space $D^4$ without any vertical displacement of the shock.

Having now described my invention and the manner of using the same, I desire to insist that I do not care to be limited to the particular details of construction shown and described, excepting in those claims specific- ally referring to such details, but desire included within the scope of my invention all equivalents for producing the same result.

I claim—

1. A corn-shock press, comprising a suitable supporting portable frame, and a boom movably secured to said frame at one side of the line of draft thereof, said boom having a V-shaped end, and means for pressing a shock in said end, substantially as described.

2. A portable corn-shock press, comprising a supporting-frame, a boom pivotally secured thereto, having its end bifurcated, a cable rope or chain adapted to be passed around the outside of the shock, and means on said arm for drawing the ends of the said cable whereby the shock will be compressed between the arms of the bifurcated ends of the boom, substantially as described.

3. In a corn-shock press, the combination of a movable mounted frame, a derrick beam or support mounted on said frame, a press-boom having a bifurcated end and pivotally mounted on said derrick-support, and a rope or cable secured at one end near the outer end of the boom and trailed over a pulley or antifriction-wheel mounted in the upper portion of the derrick-support, and means whereby the end of said cable or rope may be made fast to the derrick-support whereby the vertical adjustment of the outer or swinging end of the boom may be determined, substantially as described.

4. In a portable corn-shock press, the combination of an open frame mounted upon wheels, a vertical support secured thereto and having a windlass, in combination with a boom pivotally secured at its inner end to said support and also provided with a windlass near its inner end, said boom having two outwardly-spreading arms at its outer end, and means upon the boom for compressing the corn-shock between said spreading arms by the use of said windlass or windlasses, substantially as described.

In testimony that I claim the foregoing as my invention I affix my signature, in presence of two witnesses, this 15th day of January, A. D. 1896.

GEORGE D. FOSTER.

Witnesses:
C. J. STORM,
H. F. STORM.